(12) United States Patent
Carlson et al.

(10) Patent No.: US 10,812,873 B2
(45) Date of Patent: Oct. 20, 2020

(54) IDENTIFYING SEGMENT BOUNDARIES OF RECORDED VIDEO EVENTS BASED ON AGGREGATED VIEWER MEASUREMENT DATA

(71) Applicant: DISH Network L.L.C., Englewood, CO (US)

(72) Inventors: Jason P. Carlson, Englewood, CO (US); Xi Hua, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/210,075

(22) Filed: Dec. 5, 2018

(65) Prior Publication Data

US 2020/0186895 A1   Jun. 11, 2020

(51) Int. Cl.
| | |
|---|---|
| *H04N 21/84* | (2011.01) |
| *H04N 21/845* | (2011.01) |
| *H04N 21/258* | (2011.01) |
| *H04N 21/472* | (2011.01) |
| *H04N 21/2387* | (2011.01) |
| *H04N 21/262* | (2011.01) |

(52) U.S. Cl.
CPC ..... *H04N 21/8456* (2013.01); *H04N 21/2387* (2013.01); *H04N 21/25825* (2013.01); *H04N 21/26233* (2013.01); *H04N 21/47217* (2013.01)

(58) Field of Classification Search
CPC .................................................. H04N 21/8456
USPC .......................................................... 386/262
See application file for complete search history.

(56) References Cited

U.S. PATENT DOCUMENTS

| | | | |
|---|---|---|---|
| 2010/0290761 A1* | 11/2010 | Drake | G11B 27/005 386/350 |
| 2017/0019444 A1 | 1/2017 | Minnick | |
| 2019/0268632 A1* | 8/2019 | Foerster | H04N 21/6587 |

OTHER PUBLICATIONS

Swapnil, T., U.S. Appl. No. 16/109,755, entitled "Automated Transition Classification for Binge Watching of Content," filed Aug. 23, 2018.

* cited by examiner

*Primary Examiner* — Eileen M Adams
*Assistant Examiner* — Daniel T Tekle
(74) *Attorney, Agent, or Firm* — Lorenz & Kopf LLP

(57) ABSTRACT

A computer-implemented and executed method of managing recorded video events is disclosed. The method collects viewer measurement data from presentation devices, the viewer measurement data indicating user viewing behavior associated with playback of recorded video events. The method continues by analyzing the collected viewer measurement data to estimate boundaries between segments of the recorded video events, which results in groups of estimated boundaries corresponding to the recorded video events. Cue files are generated for the recorded video events, the cue files indicating the estimated boundaries corresponding to the recorded video events. The cue files are maintained at a central system for access by the presentation devices.

19 Claims, 9 Drawing Sheets

IDENTIFYING SEGMENT BOUNDARIES OF RECORDED VIDEO EVENTS BASED ON AGGREGATED VIEWER MEASUREMENT DATA

TECHNICAL FIELD

Embodiments of the subject matter described herein relate generally to a system and related methodology for processing and managing video content. More particularly, embodiments of the subject matter relate to a technique for identifying segments of recorded video events, such as advertisements and commercials.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded video programming data is sent via a cable or wireless data link to the viewer's home, where the video data is ultimately decoded by the STB. The decoded signals can then be viewed on a television or other appropriate display as desired by the viewer.

Digital video recorder (DVR) functionality allows viewers to record video in a digital format to a disk drive or other type of storage medium for later playback. DVR functionality is often incorporated into STBs for satellite and cable television services. Alternatively, stand-alone DVR devices can be utilized (with or without a STB) to digitally record video content and play back recorded content as needed.

Broadcast video events are usually recorded based on their scheduled time slots, and, therefore, recorded video events typically include the desired program content supplemented with interstitial content (e.g., commercial breaks, promotional segments, trailers, etc.). Consequently, an amount of undesirable or unwanted video content within a recorded video event is normally presented to the user during playback of the recorded event.

The prior art includes a number of "commercial skipping" technologies that are intended to identify the transition boundaries between video program content (e.g., the actual desired content) and interstitial content (e.g., commercials and advertisements) that occurs before, between, or after segments of the video program content. These prior art technologies typically utilize one or more pre-processing methodologies that flag, mark, or otherwise distinguish the interstitial content from the desired video program content. In accordance with certain conventional methodologies, human operators watch broadcast video streams in real time while manually marking the segment boundaries that define interstitial content. Data files that identify the manually marked segments can be delivered to client devices (e.g., STBs or DVRs) to enable the client devices to automatically skip the interstitial content during subsequent playback of recorded video events. In practice, relying on human operators can be expensive, and the results can be imprecise. Moreover, due to the large amount of available broadcast channels and video program content, service providers typically offer the commercial skipping feature in a limited manner. For example, the commercial skipping feature may only be provided for several channels, such as the major broadcast networks.

Accordingly, it is desirable to have an improved methodology for automatically identifying segment boundaries of recorded video events. More specifically, it is desirable to have an automated technique that can identify segment boundaries of recorded video events without relying on human monitors that view the video events as they are broadcast. Furthermore, other desirable features and characteristics will become apparent from the subsequent detailed description and the appended claims, taken in conjunction with the accompanying drawings and the foregoing technical field and background.

BRIEF SUMMARY

A computer-implemented and executed method of managing recorded video events is disclosed here. The method involves the steps of: collecting, with a processing system, viewer measurement data from a plurality of presentation devices, the viewer measurement data indicating user viewing behavior associated with playback of recorded video events; analyzing, with the processing system, the viewer measurement data as collected to estimate boundaries between segments of the recorded video events, the analyzing resulting in groups of estimated boundaries corresponding to the recorded video events; generating, with the processing system, cue files for the recorded video events, the cue files indicating the estimated boundaries corresponding to the recorded video events; and maintaining, at the processing system, the cue files for access by the plurality of presentation devices.

A computer-implemented processing system is also disclosed. The system includes a processor device and a non-transitory computer readable medium operatively associated with the processor device. The computer readable medium has executable instructions configurable to cause the processor device to perform a method of managing recorded video events. The method involves the steps of: collecting viewer measurement data from a plurality of presentation devices, the viewer measurement data indicating user viewing behavior associated with playback of recorded video events; analyzing the viewer measurement data as collected to estimate boundaries between segments of the recorded video events, the analyzing resulting in groups of estimated boundaries corresponding to the recorded video events; generating cue files for the recorded video events, the cue files indicating the estimated boundaries corresponding to the recorded video events; and maintaining the generated cue files for access by the plurality of presentation devices.

Another computer-implemented and executed method of managing recorded video events is also disclosed here. The method involves the steps of: collecting, with a processing system, viewer measurement data from a plurality of presentation devices, the viewer measurement data indicating user viewing behavior associated with playback of recorded video events; and, for each recorded video event of interest, performing the following steps with the processing system: estimating individually-derived segment boundaries between segments of the recorded video event of interest, using only the viewer measurement data collected from an individual one of the presentation devices, wherein the estimating step is repeated for viewer measurement data collected from a plurality of different presentation devices to obtain a corresponding plurality of device-specific segment boundary groups for the recorded video event of interest; calculating, from the plurality of device-specific segment boundary groups, group-derived segment boundaries between segments of the recorded video event of interest; and generating a cue file for the recorded video event of interest, the cue file indicating the calculated group-derived segment boundaries between segments of the recorded video event of interest. The method also maintains, at the processing system, generated cue files corresponding to at least some of the recorded video events; and communicates at least one of the generated cue files from the processing system. The cue files that are communicated from the processing system are intended for receipt by at least one of the presentation devices, wherein the generated cue files are formatted to enable the presentation devices to identify the calculated group-derived segment boundaries for purposes of selectively playing or selectively skipping certain segments of the recorded video events.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
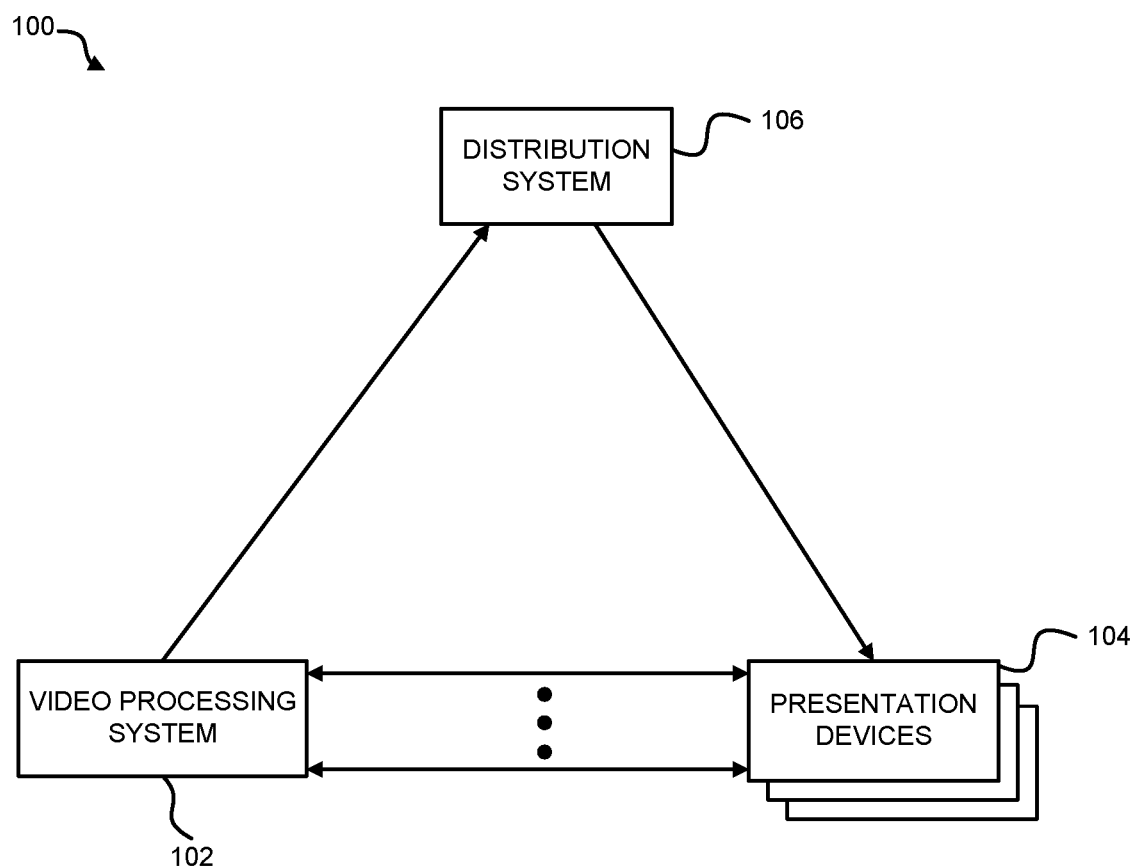
FIG. 1 is a schematic representation of an embodiment of a video services system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The following description relates to a video services system that is suitably configured to process audio/visual content for presentation to a user. Although the following description focuses on the processing of recorded video content, the subject matter may also be utilized to handle audio content conveyed in an audio stream, such as a broadcast radio program, a streaming music channel, or the like.

The exemplary embodiments described below relate to a video delivery system such as a satellite television system, a cable delivery system, an Internet-based content delivery system, or the like. The disclosed subject matter relates to the processing and managing of recorded video events in a manner that leverages a methodology that is akin to crowdsourcing. More specifically, the disclosed methodology relates to an automated technique for identifying boundaries between segments of video program content and interstitial content that appears in a recorded video event, wherein the methodology is based on the analysis of aggregated data collected from a population of video presentation (playback) devices. In accordance with certain embodiments, a centralized processing system collects viewer measurement data (captured by the individual video presentation devices during playback of recorded video content) and analyzes the collected viewer measurement data in a suitable manner to identify boundaries/transitions between the desired program segments and interstitial segments. The processing system generates a cue file (or an equivalent data object) for each recorded video event under consideration, wherein the cue file includes or otherwise indicates the "crowdsource-derived" segment boundaries for that particular video event. Thereafter, cue files can be maintained at the processing system, sent to a centralized distribution system, delivered to client devices (STBs, DVRs, smart television sets, etc.), or otherwise made available as needed during subsequent playback of the recorded video events. Notably, the segment identification methodology described herein can be performed efficiently, accurately, and effectively without requiring manual tagging or manual bookmarking (by a paid agent, such as a human operator) of different video segments in the recorded video event.

With reference to the drawings, FIG. 1 is a schematic representation of an embodiment of a video services system 100, which is suitably arranged and configured to support the exemplary methodology described in detail below. It should be appreciated that the block diagram shown in FIG. 1 represents a simplified version of the system 100, for ease of description and clarity. A practical implementation of the system 100 will typically include additional components and functionality that need not be shown or described here. The illustrated embodiment of the system 100 includes, without limitation: a processing system 102, such as a centralized data center; a plurality of presentation devices 104; and an optional distribution system 106, which may be utilized in certain embodiments. The components shown in FIG. 1 are in data communication with one another as needed to support the methodology described herein. For the sake of clarity and simplicity, FIG. 1 does not show any network infrastructure. Nonetheless, it should be understood that any suitably configured network arrangement can be utilized to support data communication between the various components and elements shown in FIG. 1. Such data communication may take place using the Internet, satellite communication links, and/or a telephone network, for example. Moreover, a data communication link leveraged by the system 100 can be a tangible link or a wireless link.

The processing system 102 can be any suitably configured and arranged computer-implemented component, hardware, software logic, etc., or any combination thereof, which is capable of processing metadata to generate cue files in the manner disclosed herein. For example, the processing system 102 may be realized with a piece of computer hardware that is owned or operated by a video services provider. In a typical implementation, the processing system 102 is a cloud-based server component that supports communication with any number of client devices, such as the presentation devices 104. Regardless of its form factor and hardware platform, the processing system 102 is suitably configured to support the desired features and functions using the appropriate hardware, software, firmware, etc.

Similarly, the distribution system 106 can also be realized using any suitably configured and arranged computer-implemented component, hardware, software logic, etc., or any combination thereof, which is capable of receiving cue files for distribution, maintaining the cue files as needed, and providing cue files to client devices such as the video presentation devices. For example, the distribution system 106 may be realized with a piece of computer hardware that is owned or operated by a video services provider or by an independent (third party) service. In certain embodiments, the distribution system 106 and the processing system 102 can be physically located in the same facility. Moreover, the distribution system 106 and the processing system 102 can be implemented together in a single piece of computer-based hardware if so desired. In a typical implementation, the distribution system 106 is physically distinct and remotely located from the processing system 102. For the illustrated embodiment, the distribution system 106 is a cloud-based server component that supports communication with any number of client devices, such as the presentation devices 104. Regardless of its form factor and hardware platform, the distribution system 106 is suitably configured to support the desired features and functions using the appropriate hardware, software, firmware, etc.

Each of the presentation devices 104 is suitably configured and arranged to perform at least the following functions: playing recorded video events; capturing viewer measurement (VM) data during playback of recorded video events; receiving cue files for recorded video events; and utilizing cue files in conjunction with playback of corresponding recorded video events. A presentation device 104 may also be configured and arranged to support the recording and saving of video events. In this regard, a presentation device 104 can be realized as a devoted DVR device or as another piece of hardware that incorporates video recorder functionality. In typical deployments, the presentation devices 104 are implemented as standalone DVR devices, STBs, smart television sets, streaming media appliances, or the like, which receive and handle video content that is broadcast or otherwise delivered by a video service provider. In certain embodiments, a presentation device 104 or its functionality as described herein can be realized with: a personal computer (e.g., a laptop, desktop, tablet, or other form factor); a mobile phone; a personal media player; a video game console or device; a vehicle-based entertainment system; or the like. In this regard, the methodology described here can also be utilized with presentation devices 104 that lack video recording functionality, as long as those devices are capable of playing back recorded video events (e.g., a saved video file), capturing viewer measurement data, and handling cue files in the manner described here.

In accordance with the exemplary use case presented here, the presentation devices 104 record and save broadcast video events in a conventional manner. In accordance with exemplary embodiments, video content received and recorded by the presentation devices 104 may be formatted in compliance with one of the MPEG encoding standards, such as MPEG-2 or MPEG-4, as may be used in DBS systems, terrestrial Advanced Television Systems Committee (ATSC) systems or cable systems. However, different audio and video data formats and encoding schemes may be utilized in other implementations.

During playback of recorded video events, the presentation devices 104 capture and save VM data that is associated with the activation of certain user playback control commands, such as fast-forward, skip-backward, pause, play, and skip-forward commands. Each presentation device 104 saves its VM data in association with the corresponding recorded video events. The processing system 102 collects the VM data from the source presentation devices 104, analyzes and processes the aggregated VM data, and generates cue files for at least some of the recorded video events. The cue files include temporal markers, flags, or identifiers of the segment boundaries for the corresponding recorded video events. The cue files are delivered to the presentation devices 104 for use during subsequent playback of the recorded video events. In this regard, the processing system 102 can deliver the cue files to the presentation devices 104, or the cue files can be indirectly provided to the presentation devices 104 via the distribution system 106.

Figure 2:
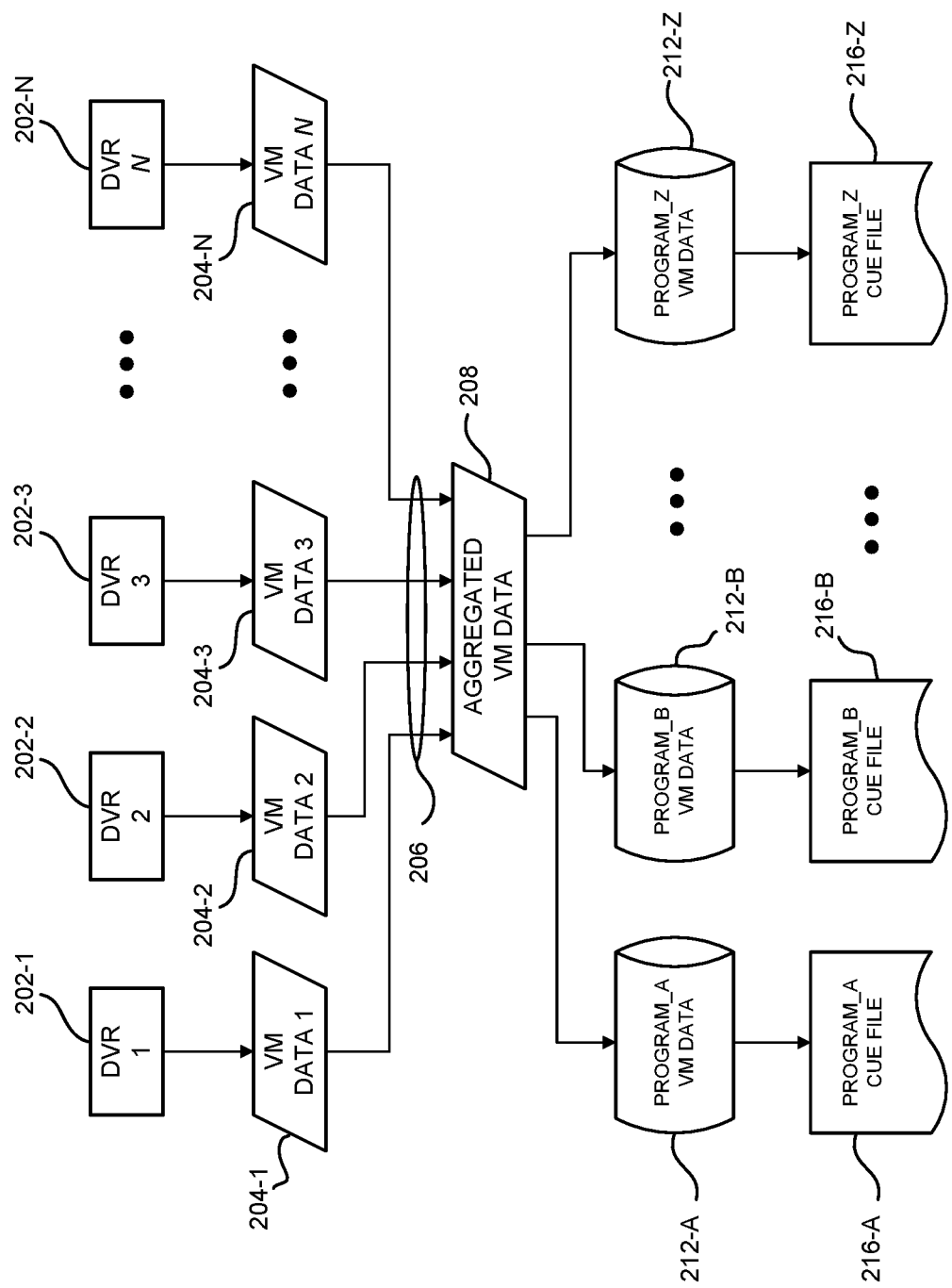
FIG. 2 is a diagram that illustrates processing and handling of data associated with recorded video events.

FIG. 2 is a diagram that illustrates processing and handling of data associated with recorded video events. FIG. 2 depicts a plurality of DVR devices 202 (individually labeled 202-1, 202-2, 202-3, and 202-N), each configured to capture VM data 204 (individually labeled 204-1, 204-2, 204-3, and 204-N) associated with the playback of recorded video events. It should be appreciated that any number, N, of DVR devices 202 can be supported by the processing system 102. For each individual DVR device 202, corresponding VM data 204 can be captured and saved for each recorded video event that is played back.

The VM data 204 for a particular video event indicates user viewing behavior associated with the playback of that event. More specifically, the VM data 204 includes temporal markers that indicate changes in playback status as captured by the source DVR device 202 during presentation of the recorded video event. Moreover, the temporal markers are associated with timestamp references of the recorded video events. In accordance with the exemplary embodiment described here, the temporal markers reference the presentation timestamp (PTS) of the particular video event. As is well understood, the PTS for a video event is a value that increments in a consistent and predictable manner throughout the duration of the event, regardless of the number of segments, and regardless of whether a segment contains program content or interstitial content. In this regard, the PTS value represents an "internal" time reference for the video event.

A temporal marker included in the VM data 204 may indicate any of the following changes in playback status, which correspond to user-initiated playback control commands, without limitation: skip-forward start; skip-forward end; skip-backward start; skip-backward end; play recorded video event; pause recorded video event; stop playback of recorded video event; exit the playback device/service; fast-forward start; fast-forward end; fast-rewind start; fast-rewind end. Thus, a temporal marker includes or otherwise indicates the occurrence of one of the playback control commands listed above, along with a corresponding time indicator (such as the PTS) for that occurrence. In accordance with certain embodiments, the following tokens are available for use in this context:

DVR_DURATION
DVR_START
DVR_START_LEGACY
DVR_PLAY
DVR_RESUME
DVR_PAUSE
DVR_SKIP_FWD_START
DVR_SKIP_FWD_END
DVR_SKIP_BACK_START
DVR_SKIP_BACK_END
DVR_4×RWD_START
DVR_4×RWD_END
DVR_15×RWD_START
DVR_15×RWD_END
DVR_300×RWD_START
DVR_300×RWD_END
DVR_4×FWD_START
DVR_4×FWD_END
DVR_15×FWD_START
DVR_15×FWD_END
DVR_300×FWD_START
DVR_300×FWD_END
DVR_EOE
DVR_EXIT
DVR_REMAINING
DVR_RESUME_LEGACY
DVR_60×RWD_START
DVR_60×RWD_END
DVR_60×FWD_START
DVR_60×FWD ENDDVR_1_15_FWD_START
DVR_1_15_FWD_END
DVR_1_4_FWD_START
DVR_1_4_FWD_END
DVR_1_4_RWD_START
DVR_1_4_RWD_END
DVR_1_1_RWD_START
DVR_1_1_RWD_END
DVR_START_WITH_SECONDS
DVR_RESUME_WITH_SECONDS
DVR_START_VOD
DVR_RESUME_VOD
DVR_START_AD
DVR_START_PTAT
DVR_START_PTAT_WITH_AUTOHOP
DVR_RESUME_PTAT
DVR_RESUME_PTAT_WITH_AUTOHOP
DVR_SKIP_FWD_AUTOHOP_START
DVR_SKIP_FWD_AUTOHOP_END

Which of the above tokens are actually used can vary from one implementation to another. In this regard, an exemplary embodiment contemplated here only uses the following tokens: DVR_PLAY; DVR_SKIP_FWD_END; DVR_4×_FWD_START; DVR_15 FWD_START; DVR_SKIP_BACK_END; and DVR_SKIP_FWD_START. Another embodiment uses the DVR_EXIT token to infer when to prompt the user with an option to begin playing the next event in the series.

The playback control commands, which are conveyed with the temporal markers, can be reviewed and analyzed to derive and estimate the segment boundaries between desired program content and undesirable (skipped over or unwatched) interstitial content. In this regard, most viewers of recorded video programs activate the skip-forward function or the fast-forward function at or near the beginning of each commercial break. Many viewers of recorded video content activate the skip-backward function or the fast-rewind function if they have advanced too far beyond the end of a commercial break; these viewers attempt to "rewind" the recorded video event to a point that is closer to the beginning of the next desired segment boundary. Thus, the VM data 204 can be analyzed in an attempt to detect certain types of observable viewer behaviors, for purposes of identifying the segment boundaries between program content and interstitial content.

It should be appreciated that the VM data 204 generated by a DVR device 202 can be arranged, organized, and/or formatted on an event-by-event basis. In other words, the VM data 204 must be linked or otherwise associated with the corresponding recorded video event. To this end, the VM data 204 for any individual recorded video event includes content-identifying data that uniquely identifies a specific airing or broadcast of that event by a particular video service. For the exemplary embodiment presented here, the content-identifying data includes at least: (1) a service identifier of the broadcasting video service (e.g., a network identifier, a channel identifier, or the like); and (2) an original program start time of the video event of interest. The original program start time is preferably based on a standard or universal time reference, such as Universal Coordinated Time (UTC). As a practical matter, each unique broadcast or airing of a video event can be identified by these two parameters. Although not required, additional identifying information can be utilized if desired, such as the name or title of the program, the episode number, the channel name or number, etc.

Unique identification of a video event allows the system to distinguish different "variants" of the same program or show, wherein the different variants might be broadcast in different local areas or time zones by different network affiliates, and with different interstitial content (e.g., more or less commercial breaks, different time slots for commercial breaks, and interstitial segments having different runtimes). For example, a show titled "Mark's Wonderful Life" originally broadcast by a local affiliate in San Diego, Calif. might contain four commercial breaks, while the same show originally broadcast by a local affiliate in Denver, Colo. might contain only three commercial breaks. These two broadcasts of the same show are treated as two distinct and unique video events. Moreover, if the same show, with identical program content and interstitial content is broadcast by a local affiliate at different scheduled times, each broadcast can be treated as a unique video event due to the different broadcast time.

The VM data 204 captured by a DVR device 202 for a single recorded video event may reflect any number of playback iterations, by any number of users. Accordingly, the source DVR device 202 can be suitably configured to generate separate VM data objects for each distinct playback iteration. Alternatively or additionally, the source DVR device 202 can generate a combined or aggregated VM data object that collectively encompasses multiple playback iterations of the same recorded video event, using the group-derived techniques described in more detail below. In accordance with certain embodiments, a DVR device 202 (or STB) assembles a single VM data file that is collected periodically (daily or hourly). The single VM file contains tokens collected during any number of viewing sessions (and corresponding to any number of events watched within that household) since the time of the last collection. The special DVR_START, DVR_START_REMOTE, and DVR_LEGACY_START tokens contain metadata about the service number (e.g., a service identifier) original recorded GMT, and that is how the system determines which specific event any VM token belongs to, as long as it is preceded by one of the start tokens in the same file. Thus, if two users watch the same event at different times (within the same day) within the household, then the corresponding VM file will include START for that event, tokens, another START for the same event, and additional tokens.

As depicted in FIG. 2, each individual DVR device 202 is responsible for capturing, saving, and formatting its own VM data 204. The VM data 204 from a plurality of different DVR devices 202 can be uploaded to a central system (such as the processing system 102 depicted in FIG. 1) at an appropriate time. In this regard, FIG. 2 depicts communication links 206 to represent the uploading of the VM data 204. Depending on the particular implementation or system requirements, the VM data 204 can be uploaded in accordance with a predetermined schedule, when the DVR devices 202 are inactive or dormant, on demand or request, or the like. Regardless of the uploading mechanism or timing, the VM data 204 captured by the different DVR devices 202 is ultimately gathered and collected as aggregated VM data 208. The aggregated VM data 208 represents the VM data 204 collected for different video events recorded by a plurality of different DVR devices 202. Notably, there is no requirement for commonality between recorded video events across different DVR devices 202. In other words, a particular video event may be recorded at only one or a proper subset of the DVR devices 202, with each of those "recording" DVR devices 202 generating its own respective VM data 204 for that particular video event—the remaining "non-recording" DVR devices 202 do not contribute any VM data 204 for that particular video event. Nonetheless, any of those non-recording DVR devices 202 can subsequently take advantage of cue files generated for any of the analyzed recorded video events.

For this particular example, the processing system 102 organizes and logically separates the aggregated VM data 208 into program-specific folders, data objects, or the like. To this end, the content-identifying information contained in the aggregated VM data 208 is utilized to locate the VM data 204 for each particular video event of interest (regardless of the source). Accordingly, the VM data 204 associated with each video event of interest is identified and collected in its respective program-specific folder or data object. FIG. 2 depicts a plurality of program-specific data objects 212 (individually labeled 212-A, 201-B, and 212-Z), each configured to hold a designated portion of the aggregated VM data 208. More specifically, the data object 212-A only contains VM data collected for the video event "Program A" and the data object 212-B only contains VM data collected for the video event "Program B". It should be appreciated that any number of data objects 212 can be created to hold VM data collected for a plurality of recorded video events.

As mentioned previously, cue files are generated from the aggregated VM data 208. More specifically, as schematically illustrated in FIG. 2, a cue file 216 is created for each recorded video event of interest, based on event-specific VM data. In this regard, FIG. 2 depicts a plurality of different cue files 216 (individually labeled 216-A, 216-B, and 216-Z), each of which is generated from the corresponding event-specific VM data. Although not always the case, FIG. 2 depicts cue files 216 for each event-specific data object 212. In certain situations, the event-specific VM data may not indicate or yield useful, reliable, or accurate estimations of the segment boundaries. In such situations, a cue file need not be generated.

A typical use case will now be described with reference to FIGS. 3-8, which include some process flow charts. The various tasks performed in connection with an illustrated process may be performed by software, hardware, firmware, or any combination thereof. For illustrative purposes, the following description may refer to elements mentioned above in connection with FIGS. 1 and 2. It should be appreciated that a process described here may include any number of additional or alternative tasks, the tasks shown in the figures need not be performed in the illustrated order, and a process described here may be incorporated into a more comprehensive procedure or process having additional functionality not described in detail herein. Moreover, one or more of the tasks shown in a figure could be omitted from an embodiment of the illustrated process as long as the intended overall functionality remains intact.

Figure 3:
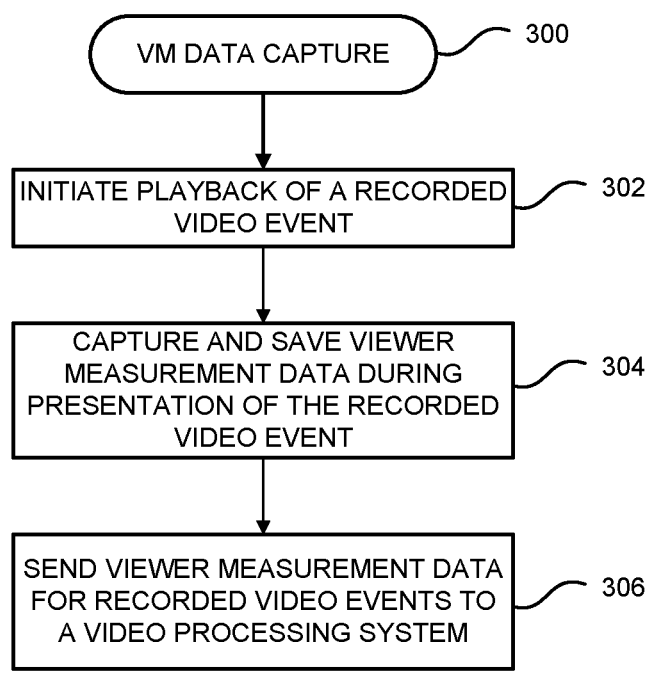
FIG. 3 is a flow chart that illustrates a process for capturing viewer measurement data.

For this example, FIG. 3 depicts a process 300 for capturing viewer measurement data. The process 300 is performed by the presentation devices 104 (e.g., the DVR devices 202). This description assumes that at least one recorded video event is already available for playback at the presentation device 104. Accordingly, the process 300 may begin by initiating playback of a recorded video event (task 302). During the playback presentation of the recorded video event, the presentation device 104 captures, records, and saves relevant VM data (task 304). As mentioned above, the VM data of interest will include temporal markers that indicate certain playback control commands entered by the user during playback of the recorded video event. VM data for any number of recorded video events can be captured and stored by the presentation device 104, as needed. Eventually, the presentation device 104 sends its VM data to the processing system 102 for review and analysis (task 306).

Figure 4:
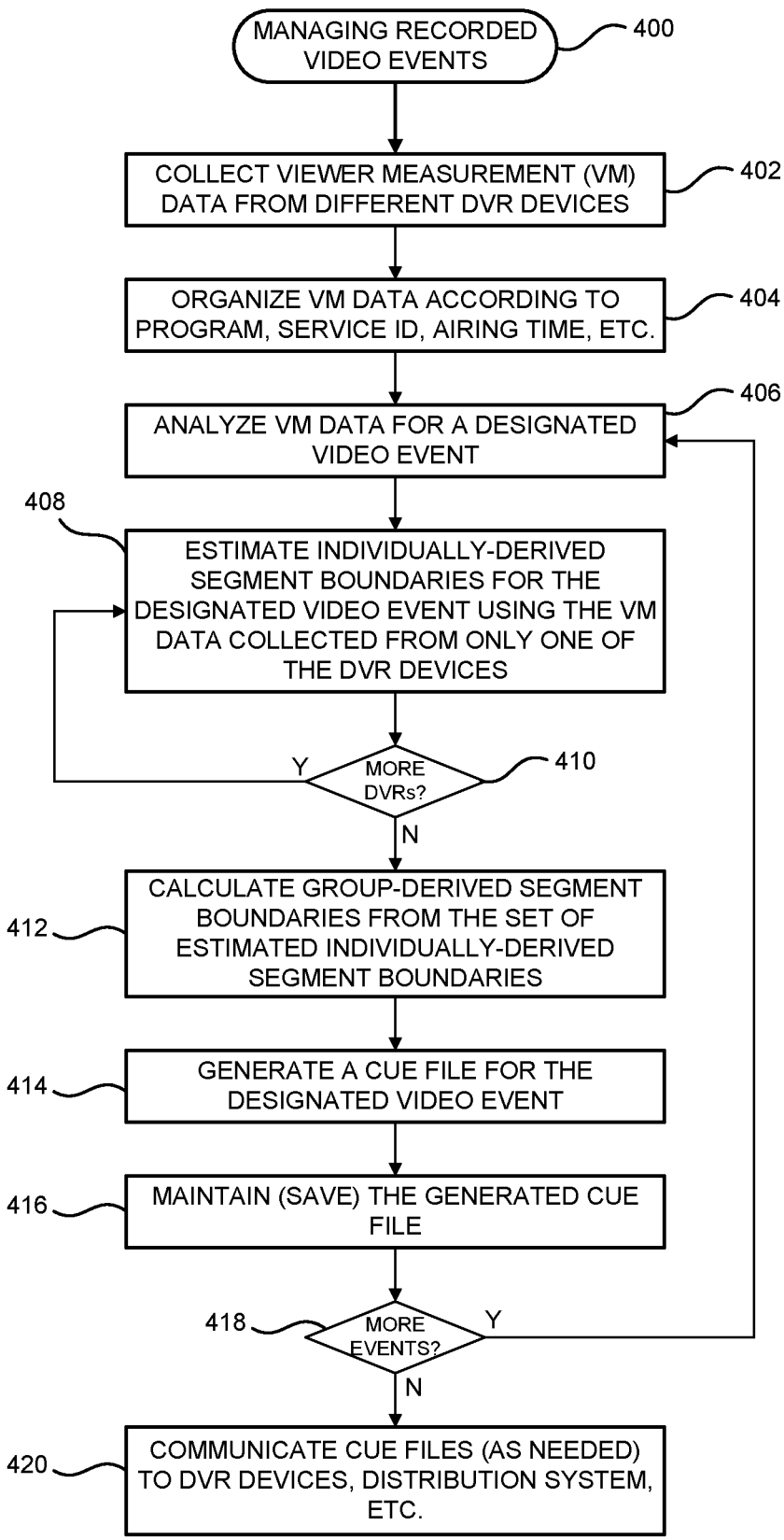
FIG. 4 is a flow chart that illustrates a process for managing and aggregating data associated with recorded video events.

FIG. 4 depicts a process 400 for managing recorded video events. For this example, the process 400 is performed by the processing system 102. This description assumes that VM data for different video events has already been captured by a plurality of different presentation devices 104 (e.g., the DVR devices 202). The process 400 may begin by collecting VM data from a plurality of different presentation devices (task 402). As explained above, the VM data indicates user viewing behavior that is associated with the playback of recorded video events. The collected (aggregated) VM data is organized according to any scheme that can uniquely identify each video event (task 404). As described above with reference to FIG. 2, certain embodiments organize the aggregated VM data according to a service identifier, a broadcast or airing time, a program identifier, etc.

Organizing the aggregated VM data makes it easier to analyze the VM data on an event-by-event basis. The goal is to accurately estimate the boundaries between the segments of each recorded video event of interest, resulting in groups or sets of estimated boundaries corresponding to the different recorded video events. In this regard, the process 400 continues by analyzing the VM data as collected for a single designated video event (task 406). Although the analytical framework and approach can vary from one implementation to another, the following example is described as a two-step methodology wherein the event-specific VM data is initially reviewed for each individual source DVR device and, thereafter, the individually-derived results are reviewed to obtain group-derived segment boundaries that leverage the aggregated VM data. Following this exemplary scheme, the process 400 estimates individually-derived segment boundaries for the recorded video event of interest (task 408). The individually-derived segment boundaries are estimated by using only the VM data (for the designated video event) that was collected from an individual one of the source DVR devices. In other words, an iteration of task 408 is performed to estimate the segment boundaries in response to the VM data captured by one and only one DVR device.

If VM data for other DVR devices remains available for review (the "Yes" branch of query task 410), then task 408 is repeated to obtain the individually-derived segment boundaries for the designated video event, using only the VM data captured by a different DVR device. Thus, the estimating performed at task 408 can be repeated any number of times for VM data collected from a plurality of different DVR devices to obtain a corresponding plurality of device-specific segment boundary groups for the recorded video event of interest.

Figure 5:
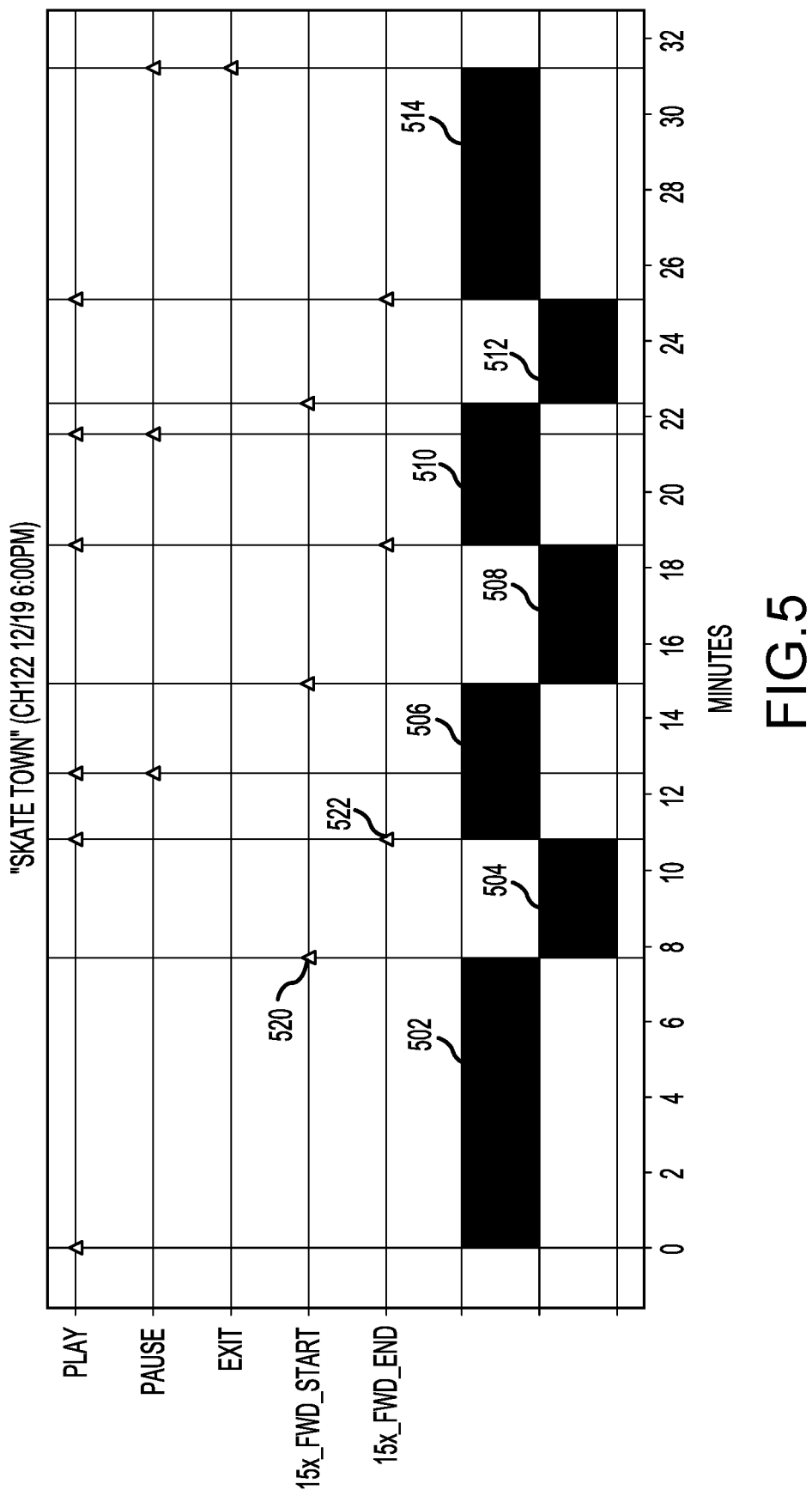
FIG. 5 is a diagram that depicts viewer measurement data for a video event, as captured by only one video presentation device.

An exemplary methodology for obtaining the individually-derived segment boundaries for a recorded video event will now be described with reference to FIG. 5 and FIG. 6. For this example, FIG. 5 is a diagram that depicts VM data (for a particular recorded video event titled Skate Town), as captured by only one DVR device. The recorded version of Skate Town was broadcast on channel 122 on December 19, with a 6:00 PM start time. In FIG. 5, the horizontal axis represents the running time of the recorded video event, in minutes. The vertical axis includes timelines for five different types of temporal markers, wherein each temporal marker is associated with a playback control command. For this particular example, the playback control commands include: play; pause; exit; 15× fast-forward start; and 15× fast-forward end. The triangles along any given horizontal timeline indicate discrete occurrences of the corresponding playback control command. For the illustrated example, the play command was executed six times (at or near 0, 11, 12.5, 18.5, 21.5, and 25 minutes). The pause command was executed three times (at or near 12.5, 21.5, and 31 minutes). The exit command was executed once, at or near 31 minutes. The 15× fast-forward start command was executed three times (at or near 8, 15, and 22 minutes). The 15× fast-forward end command was executed three times (at or near 11, 18.5, and 25 minutes).

The shaded blocks in FIG. 5 represent different segments of the video event of interest, separated by estimated boundaries that are derived from the timing of the temporal markers relative to the runtime of the video event. The segments 502, 506, 510, 514 represent segments of viewed video content, as estimated by the processing system. Conversely, the segments 504, 508, 512 represent segments of unviewed or skipped content, as estimated by the processing system. The system reviews the VM data as collected to identify particular sequences of the temporal markers, wherein presence of certain sequences indicate unwatched or skipped segments of the recorded video event, and presence of other sequences indicate viewed segments of the recorded video event. In response to the detection of one or more of these sequences, the system designates a beginning time reference and an ending time reference of each unwatched or skipped segment, based on the timing information of the temporal markers included in those particular sequences. For the scenario reflected in FIG. 5, the boundaries of the interstitial segment 504 can be estimated based on the sequence of "15× fast-forward start" followed by "15× fast-forward end"—under the assumption that the viewer activated those playback control commands in an attempt to quickly advance past the interstitial segment 504. In this regard, the temporal markers 520, 522 define the segment boundaries for the interstitial segment 504. The same detected sequence ("15× fast-forward start" followed by "15× fast-forward end") is used to estimate the boundaries of the other interstitial segments 508, 512.

It should be appreciated that alternative or additional patterns and sequences of temporal markers can be considered for purposes of estimating the boundaries of video content segments or interstitial segments. For example, the boundaries of the interstitial segments 504, 508, 512 can instead be estimated based on the sequence of "15× fast-forward start" followed by "play". As another example, the boundaries of the video content segments 506, 510 can be estimated based on the sequence of "15× fast-forward end" followed by "15× fast-forward start" or the sequence of "play" followed by "15× fast-forward start". As yet another example, the boundaries of the final video content segment 514 can be estimated based on the sequence of "play" followed by "exit" or the sequence of "15× fast-forward end" followed by "exit". Moreover, the processing system can consider a plurality of different sequences or patterns of temporal markers that might redundantly identify the boundaries of the same segment, to increase accuracy of the estimated boundaries.

Figure 6:
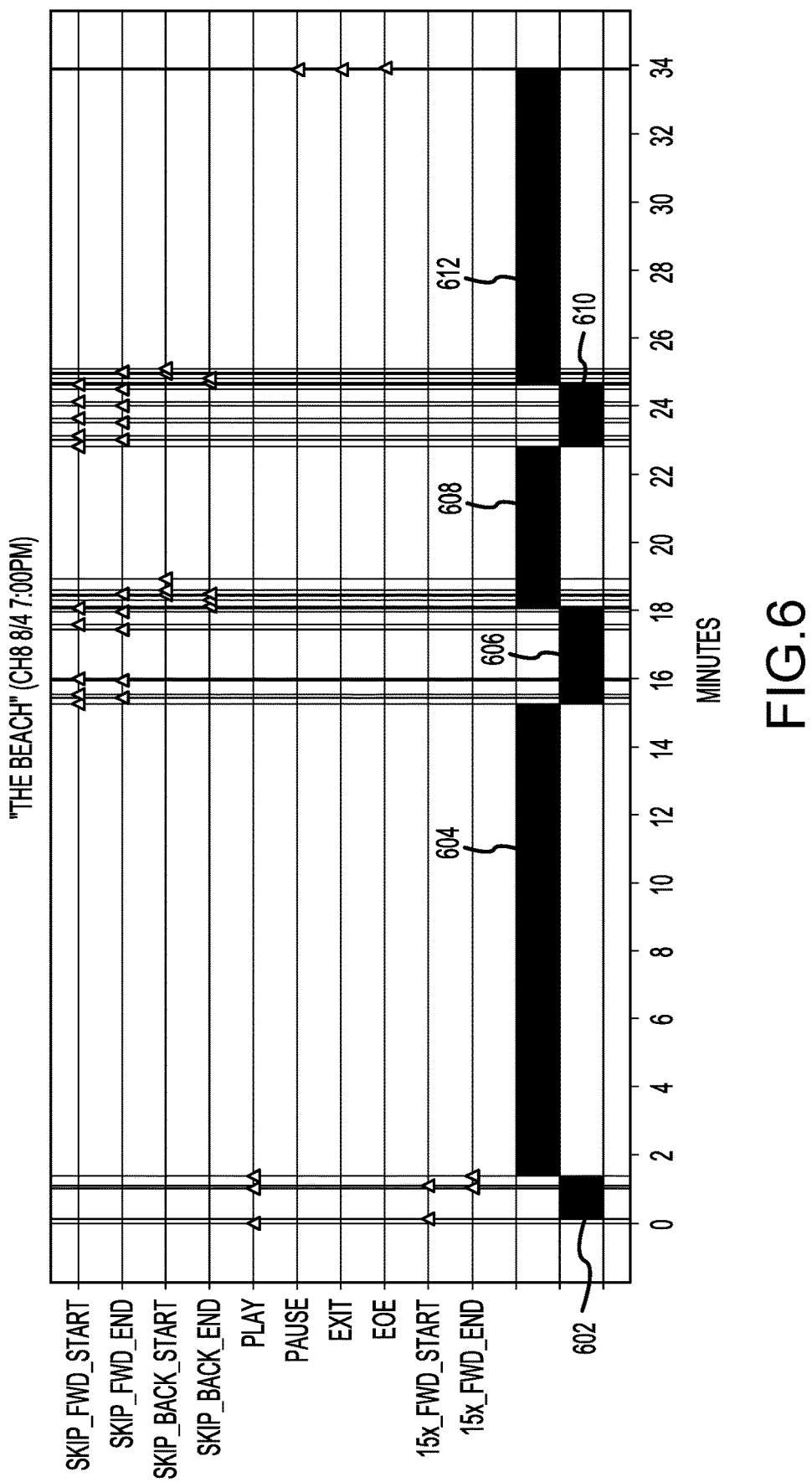
FIG. 6 is a diagram that depicts viewer measurement data for a video event, as captured by only one video presentation device.

FIG. 6 is a similar diagram that depicts VM data for another video event (titled The Beach), as captured by only one DVR device. The recorded version of The Beach was broadcast on channel 8 on August 4, with a 7:00 PM start time. The vertical axis includes timelines for ten different types of temporal markers, wherein each temporal marker is associated with a playback control command. For this particular example, the playback control commands include: skip forward start; skip forward end; skip back start; skip back end; play; pause; exit; end of event (EOE); 15× fast-forward start; and 15× fast-forward end. The triangles along any given horizontal timeline indicate discrete occurrences of the corresponding playback control command. The shaded blocks in FIG. 6 represent different segments of the video event of interest, separated by estimated boundaries that are derived from the timing of the temporal markers relative to the runtime of the video event. The segments 602, 606, 610 represent segments of unwatched or skipped content, as estimated by the processing system. Conversely, the segments 604, 608, 612 represent segments of viewed or watched video content, as estimated by the processing system.

For the scenario reflected in FIG. 6, the boundaries of the interstitial segment 602 can be estimated based on the sequence of "15× fast-forward start" followed by "15× fast-forward end"—under the assumption that the viewer activated those playback control commands in an attempt to quickly advance past the interstitial segment 602. The boundaries of the video content segment 604 can be estimated based on the detected sequence of "play" or "15× fast-forward end" followed by "skip forward start". The boundaries of the interstitial segment 606 can be estimated based on the following detected pattern or behavior: a first occurrence of "skip forward start" followed by one or more occurrences of "skip back start" followed by "skip back end". This particular pattern of temporal markers corresponds to actions a viewer takes when skipping too far beyond a commercial segment and thereafter skipping back one or more times to resume playback at or near the beginning of the desired program segment. The boundaries of the video content segment 608 can be estimated based on the detected sequence of "skip back end" followed by "skip forward start". The boundaries of the interstitial segment 610 can be estimated using the methodology described previously for the interstitial segment 606. The boundaries of the video content segment 612 can be estimated based on the detected sequence of "skip back end" followed by "pause" or "exit" or "EOE".

In practice, the processing system can consider a variety of sequences and patterns of temporal markers for purposes of estimating the segment boundaries. The specific examples mentioned above are not intended to be limiting or exhaustive in any way. Indeed, an embodiment of the processing system may analyze the VM data for the presence of one or more of the following patterns/sequences of temporal markers, without limitation: (1) a "fast-forward start" marker followed by a "fast-forward end" marker; (2) a "skip-forward start" marker followed by a "skip-forward end" marker; (3) a "fast-forward start" marker followed by a "play" marker or a "pause" marker; (4) a "skip-forward start" marker followed by a "play" marker or a "pause" marker; (5) a plurality of "skip-forward start" markers alternating with a plurality of "skip-forward end" markers; (6) a "fast-forward end" marker, followed by a "fast-rewind start" marker, followed by a "fast-rewind end" marker; (7) a "skip-forward end" marker, followed by a "skip-backward start" marker, followed by a "skip-backward end" marker; (8) a "fast-forward end" marker, followed by a "skip-backward start" marker, followed by a "skip-backward end" marker; (9) a "skip-forward end" marker, followed by a "fast-rewind start" marker, followed by a "fast-rewind end" marker.

Referring back to FIG. 4, the sequence-recognition or pattern-recognition technique described above can be utilized to estimate the individually-derived segment boundaries for the designated video event. If the VM data from all of the source DVR devices has already been considered (the "No" branch of query task 410), then the process 400 continues by analyzing the individually-derived segment boundaries to obtain more accurate segment boundaries that are based on the aggregated VM data collected from the different DVR devices. More specifically, the process 400 calculates group-derived segment boundaries from the device-specific segment boundary groups (task 412). In other words, the individually-derived segment boundaries (for each recorded video event under analysis) are considered to further calculate and better estimate the boundaries between segments of the recorded video event of interest.

This description assumes that individually-derived (device specific) segment boundaries for the video event of interest have been estimated for a plurality of different source DVR devices. In practice, a larger sample size (i.e., more source DVR devices) will result in more precise segment boundary estimations. As mentioned above, the analysis and boundary estimation performed at task 408 results in individually-derived segment boundaries for the recorded video event. The group-derived segment boundaries are calculated/estimated in an appropriate manner from the individually-derived segment boundaries. In this regard, the process 400 may perform statistical computations, data filtering and/or conditioning (to remove or disregard individually-derived segment boundaries that indicate outlier values, to remove or disregard VM data that is deemed unreliable or irrelevant, etc.), weighting, prioritization, and/or other data manipulation techniques to obtain the group-derived segment boundaries. For example, some or all of the individually-derived segment boundaries may serve as inputs to a suitably designed statistics-based algorithm that generates a statistical value or metric (e.g., the mean, median, mode) to identify the timeline reference (such as the PTS) for each group-derived segment boundary. This methodology assumes that the actual segment boundaries can be accurately estimated using VM data sourced from a population of presentation devices, and that a suitably designed averaging algorithm will yield good results.

Figure 7:
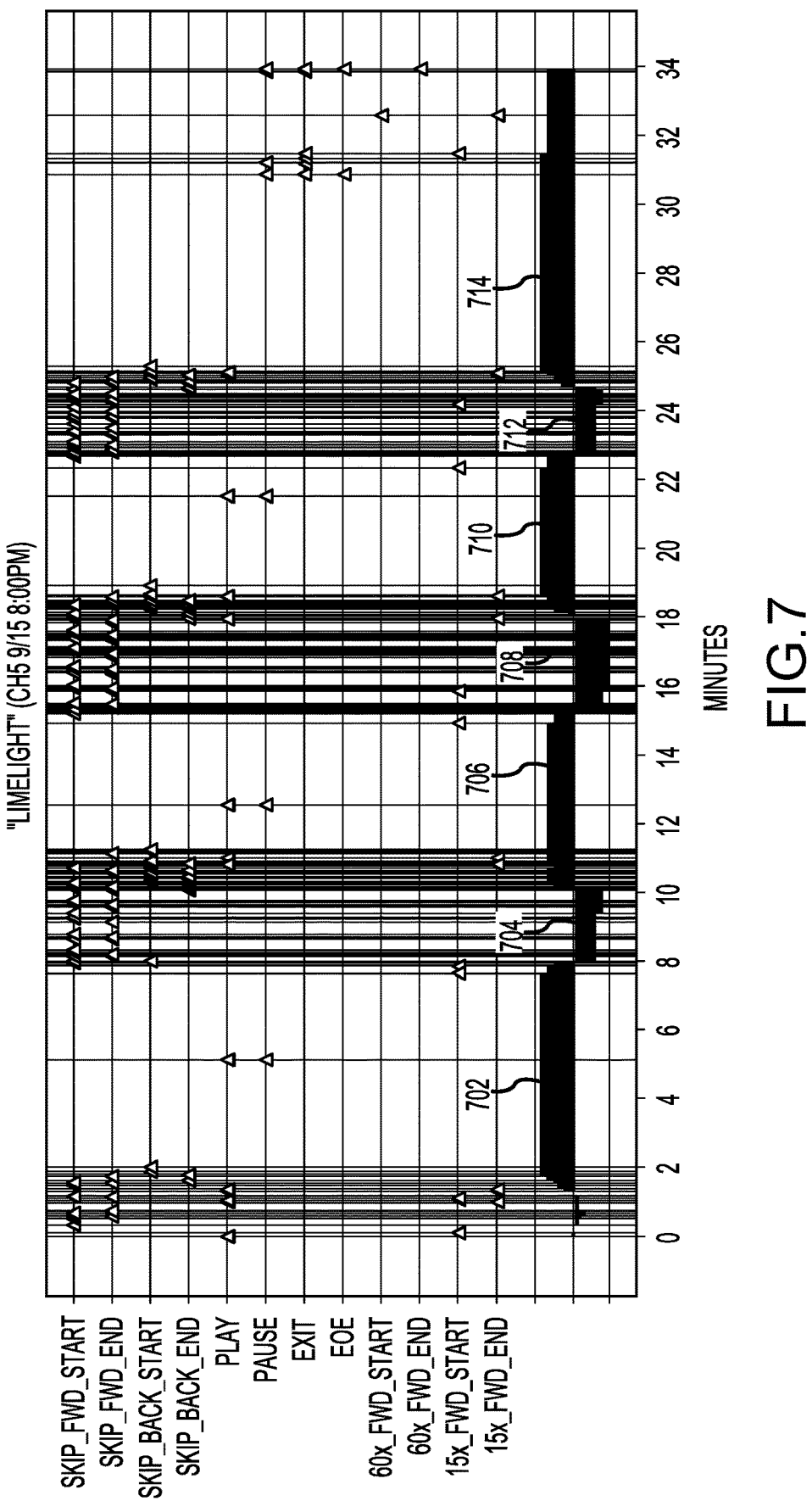
FIG. 7 is a diagram that depicts aggregated viewer measurement data for a video event, as captured by a plurality of different video presentation devices.

FIG. 7 is a diagram that depicts aggregated viewer measurement data for a video event (titled Limelight), as captured by a plurality of different video recorder devices. The vertical axis includes timelines for twelve different types of temporal markers, wherein each temporal marker is associated with a different playback control command. It should be appreciated that a given DVR device need not support all twelve of the playback control commands. Nonetheless, the diagram includes all of the possible control commands that might be supported by the overall population of DVR devices. For this particular example, the playback control commands include: skip forward start; skip forward end; skip back start; skip back end; play; pause; exit; EOE; 60× fast-forward start; 60× fast-forward end; 15× fast-forward start; and 15× fast-forward end. The triangles along any given horizontal timeline indicate discrete occurrences of the corresponding playback control command as captured by one or more DVR devices. Accordingly, in FIG. 7, a single timeline corresponding to one temporal marker can identify occurrences of the respective playback control command as captured by a single DVR device or as captured by a plurality of different DVR devices. The example described here assumes that the VM data from multiple DVR devices is analyzed.

The shaded regions in FIG. 7 represent different segments of the video event of interest, which visually indicate the group-derived estimated segment boundaries. The shaded regions represent the accumulation of the corresponding individually-derived segment boundaries (as though the individual shaded regions derived for a plurality of different DVR devices have been overlaid on the common horizontal timeline axis). Thus, the shaded regions in FIG. 7 are not depicted as uniform blocks with straight vertical delineations between segments. Instead, the shaded regions in FIG. 7 exhibit "feathered" edges that reflect variation in the different individually-derived segment boundaries calculated at task 408. For this particular example, the segments 704, 708, 712 represent segments of unwatched or skipped content, as estimated by the processing system. Conversely, the segments 702, 706, 710, 714 represent segments of viewed or watched video content, as estimated by the processing system. The appearance of the end section of the segment 714 is caused by a recording timer implementation, where the default is to start recording one minute before the scheduled beginning of an event and end recording three minutes after the scheduled end of the event. If there is a tuner conflict during the time of the extension, the extension may be truncated, and some users can disable the time extension feature. Consequently, for a given 30-minute event, some viewing sessions will be working with an exact 30 minute duration, but others can have an extended duration that goes beyond 30 minutes. Further refinement of the algorithm (perhaps considering DVR_EXIT) could be used to detect the end better.

The transitions between the shaded regions in FIG. 7 can be determined in an appropriate manner for purposes of defining the various segment boundaries. In this regard, FIG. 7 depicts the transition points as "zero-crossings" between the upper regions and the lower regions. Accordingly, for this particular example, the group-derived boundaries of the program content segment 702 are defined to be at or near 1.5 and 8.0 minutes, the group-derived boundaries of the interstitial content segment 704 are defined to be at or near 8.0 and 10.2 minutes, the group-derived boundaries of the program content segment 706 are defined to be at or near 10.2 and 15.0 minutes, the group-derived boundaries of the interstitial content segment 708 are defined to be at or near 15.0 and 18.0 minutes, the group-derived boundaries of the program content segment 710 are defined to be at or near 18.0 and 22.8 minutes, the group-derived boundaries of the interstitial content segment 712 are defined to be at or near 22.8 and 24.8 minutes, and the group-derived boundaries of the program content segment 714 are defined to be at or near 24.8 and 31.0 minutes.

In accordance with an exemplary implementation, the system simply averages together the results across multiple sessions for a given event. Individual viewing sessions can have a score of either 1.0 (content) or −1.0 (interstitial) for every moment of the presentation. Thus, if one session yielded a content segment from 3:00 to 3:04 followed by an interstitial segment, and another session yielded a content segment from 3:00 to 3:05, then the aggregated scores would be 1.0 (content) from 3:00 to 3:04, 0.0 (undetermined) from 3:04 to 3:05, and then −1.0 (interstitial) after 3:05. Another viable alternative approach considers (for a given event) all tokens for all available sessions at once to find scores, rather than going session-by-session and then averaging the results. These and other schemes can be employed to derive the final segment boundaries from the collected VM data.

Referring again to FIG. 4, the process 400 continues by generating a cue file (or any equivalent file or data object) for the recorded video event that is currently under analysis (task 414). The cue file includes or otherwise indicates the calculated and estimated group-derived segment boundaries that correspond to the recorded video event. In accordance with certain embodiments, the cue file includes the content-identifying data that uniquely points to the recorded video event to which the cue file applies, along with timing markers, flags, or indicators that identify the locations of the group-derived segment boundaries. In this regard, the cue file preferably includes a PTS value for each group-derived segment boundary, along with indicators of whether a given segment is an interstitial content segment (which is eligible to be skipped during playback) and/or indicators of whether a given segment is a program content segment (which should not be skipped during playback). Although the specific content, arrangement, and format of the cue file can vary from one implementation or embodiment to another, task 414 generates the cue file in an appropriate format that enables compatible presentation devices (DVR devices) to identify the estimated group-based boundaries for purposes of selectively playing or selectively skipping certain segments of the recorded video event. The generated cue file can be maintained/saved by the processing system (task 416) as appropriate for the particular implementation. The cue file can be maintained at the ready for access by the presentation devices, and/or for delivery from the processing system as needed.

The methodology described above can be repeated as needed to generate a cue file for each uniquely identifiable video event. If another video event is to be analyzed (the "Yes" branch of query task 418), then the process 400 returns to task 406 such that the analytical methodology can be performed for the next video event. If not (the "No" branch of query task 418), then the processing of the recorded video events and their VM data need not continue. Eventually, however, at least one of the generated cue files is communicated to an appropriate destination (task 420). For example, a cue file can be communicated from the processing system to at least one of the presentation devices on demand, upon request, or in accordance with a predetermined delivery schedule. As another example, a cue file can be communicated from the processing system to a distribution system on demand, upon request, or in accordance with a predetermined delivery schedule. Thereafter, the distribution system can provide cue files to the presentation devices as needed. In certain embodiments, the processing system or the distribution system receives a listing of recorded content that is maintained at the presentation devices, such that the cue files for recorded video events included in the listing can be selectively communicated to the presentation devices. As yet another example, cue files can be broadcast from the processing system (and/or from a distribution system) in a format that is compatible with the presentation devices, such that compatible presentation devices can receive "over the air" updates as needed.

As time goes on, the processing system continues to collect additional VM data from the presentation devices. The new VM data may be associated with repeated viewings of previously analyzed recorded video events and/or associated with viewings of recorded video events that have not been previously analyzed. The overall methodology described above can be repeated as needed with fresh VM data to update the cue files as needed.

Figure 8:
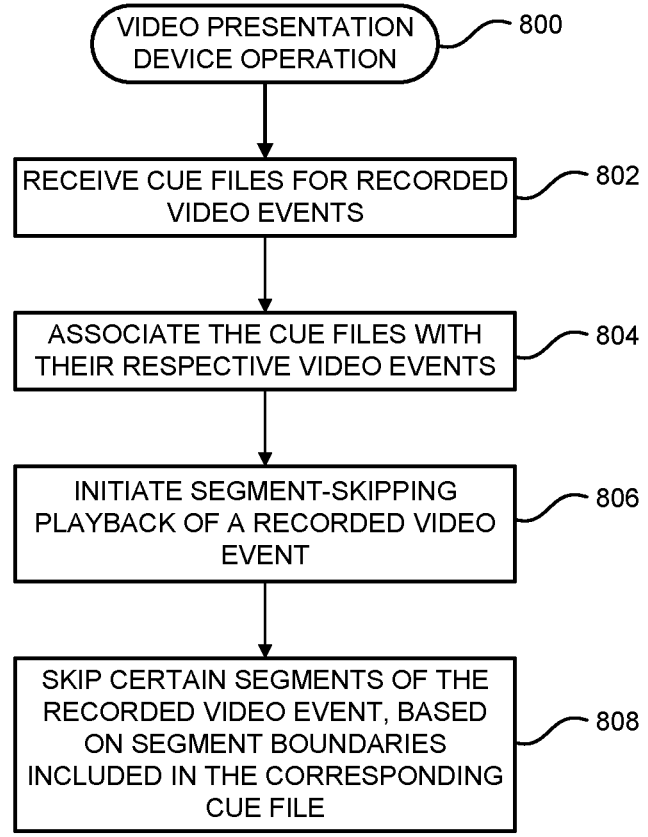
FIG. 8 is a flow chart that illustrates a process for operating a video presentation device.

FIG. 8 is a flow chart that illustrates a process 800 for operating a video presentation device, such as a DVR device or any compatible client device that supports the methodology described here. The process 800 begins by receiving cue files for recorded video events that are available for playback at the host device (task 802). The cue files are configured and formatted as described previously. The process 800 continues by associating or linking the cue files with their respective recorded video events (task 804). In practice, task 804 can utilize the content-identifying data of the cue files to create correspondence between the cue files and the recorded video events. This description assumes that the process 800 initiates a segment-skipping feature for playback of a recorded video event (task 806). In certain embodiments, the segment-skipping feature can be activated on demand by the viewer, or it can be active by default. During playback of the recorded video event, the presentation device is operated to skip certain segments of the event, based on the group-derived segment boundaries that are included in the corresponding cue file (task 808). In this regard, the identified segments of interstitial content can be automatically skipped or bypassed such that only the desired program content segments are presented to the end user.

Figure 9:
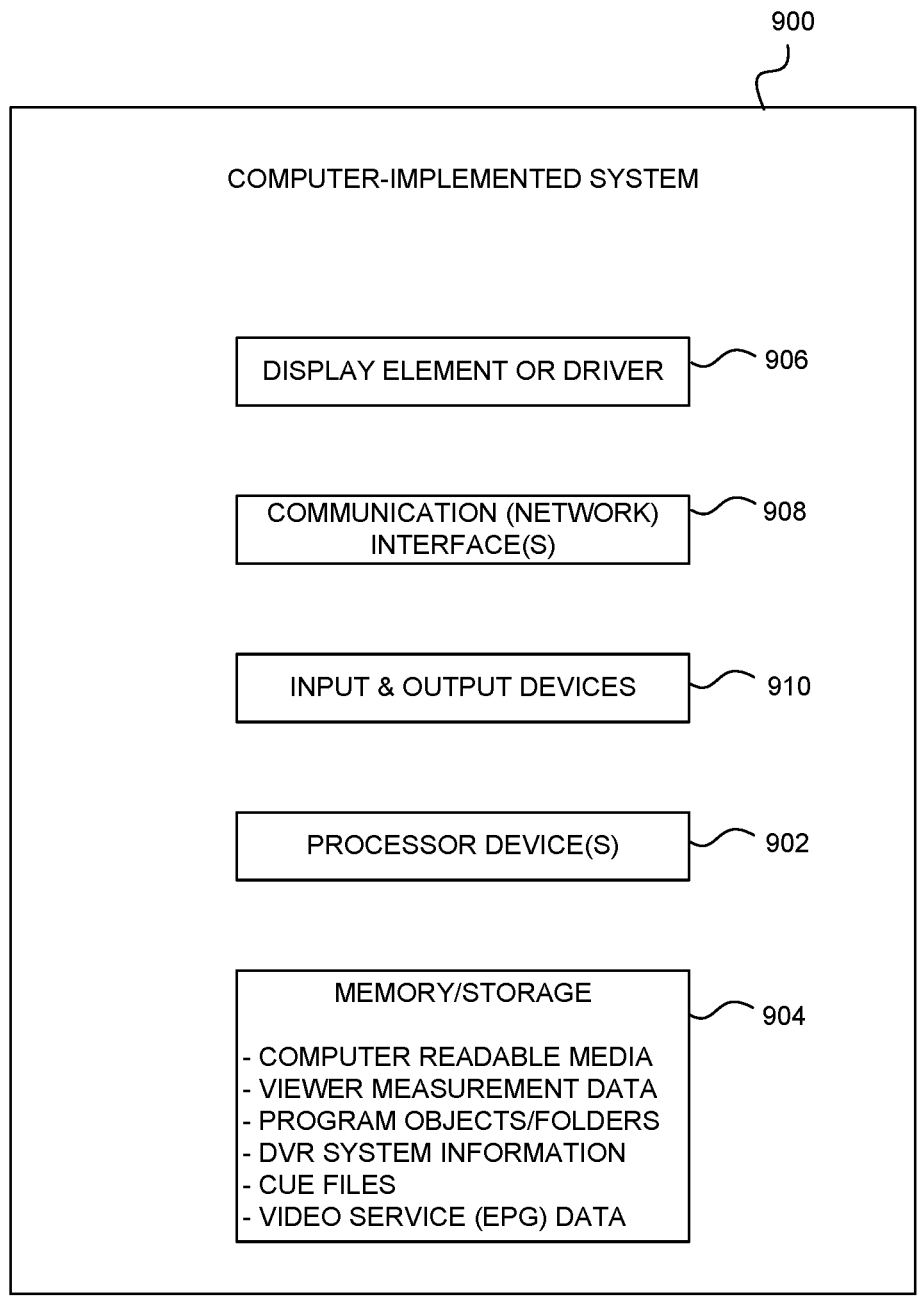
FIG. 9 is a block diagram that illustrates an exemplary embodiment of a computer-implemented device or system suitable for use with the video services system shown in FIG. 1.

The processing system 102, the distribution system 106, each presentation device 104, each DVR device 202, and other systems or devices mentioned above can be realized as (or can be integrated with) a computer-implemented component. In this regard, FIG. 9 is a simplified block diagram representation of an exemplary embodiment of a computer-implemented device or system 900 that is suitable for use with the system described herein. The illustrated embodiment of the system 900 generally includes, without limitation: at least one processor device 902; at least one memory/storage device 904; a display element or driver 906; at least one communication (network) interface 908; and input and output (I/O) devices 910. In practice, the system 900 can include additional components, elements, and functionality that may be conventional in nature or unrelated to the particular processing and handling functionality described here.

A processor device 902 may be, for example, a central processing unit (CPU), a field programmable gate array (FPGA), a microcontroller, an application specific integrated circuit (ASIC), or any other logic device or combination thereof. The memory/storage device 904 is communicatively coupled to the processor device 902, and it can be implemented with any combination of volatile and non-volatile memory. The memory/storage device 904 has non-transitory computer readable and executable instructions (program code) stored thereon, wherein the instructions are configurable to be executed by the processor device 902 as needed. When executed by the processor device 902, the instructions cause the processor device 902 to perform the associated tasks, processes, and operations defined by the instructions. Of course, the memory/storage device 904 may also include instructions associated with a file system of the host system 900 and instructions associated with other applications or programs. Moreover, the memory/storage device 904 can serve as a data storage unit for the host system 900. For example, the memory/storage device 904 can provide storage for any or all of the following, without limitation: VM data; program objects and/or folders; recorded content such as video events; client device (DVR) information; cue files; video service data, such as electronic program guide data; configuration data; and user profile data.

A display element 906 may be integrated with the system 900 or it may be communicatively coupled to the system 900 as a peripheral or accessory component. The shape, size, resolution, and technology of the display element 906 is appropriate to the particular implementation of the system 900. In certain embodiments, the display element 906 is realized as a touchscreen. The system 900 may instead include a display driver that supports an external or peripheral display element 906.

The communication interface 908 represents the hardware, software, and processing logic that enables the system 900 to support data communication with other devices. In practice, the communication interface 908 can be suitably configured to support wireless and/or wired data communication protocols as appropriate to the particular embodiment. For example, if the system 900 is a smartphone, then the communication interface 908 can be designed to support a cellular communication protocol, a short-range wireless protocol (such as the BLUETOOTH communication protocol), and a WLAN protocol. As another example, if the system 900 is a desktop or laptop computer, then the communication interface can be designed to support the BLUETOOTH communication protocol, a WLAN protocol, and a LAN communication protocol (e.g., Ethernet).

The I/O devices 910 enable the user of the system 900 to interact with the system 900 as needed. In practice, the I/O devices 910 may include, without limitation: a speaker, an audio transducer, or other audio feedback component; a haptic feedback device; a microphone; a mouse or other pointing device; a touchscreen or touchpad device; a keyboard; a joystick; or any conventional peripheral device. In this context, a touchscreen display can be categorized as an I/O device 910.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented and executed method of managing recorded video events, the method comprising the steps of:

collecting, with a processing system, viewer measurement data from a plurality of presentation devices, the viewer measurement data indicating user viewing behavior associated with playback of recorded video events;

analyzing, with the processing system, the viewer measurement data as collected to estimate boundaries between segments of the recorded video events, the analyzing resulting in groups of estimated boundaries corresponding to the recorded video events;

generating, with the processing system, cue files for the recorded video events, the cue files indicating the estimated boundaries corresponding to the recorded video events; and maintaining, at the processing system, the cue files for access by the plurality of presentation devices, wherein for each recorded video event of interest, the analyzing step comprises:

estimating individually-derived segment boundaries for the recorded video event of interest, using only the viewer measurement data collected from an individual one of the presentation devices, wherein the estimating step is repeated for viewer measurement data collected from a plurality of different presentation devices to obtain a corresponding plurality of device-specific segment boundary groups for the recorded video event of interest;

scoring segments of the recorded video event of interest as defined by the individually-derived segment boundaries by assigning a first score to each content segment and by assigning a second score to each interstitial segment; and calculating, from the plurality of device-specific segment boundary groups, group-derived segment boundaries between segments of the recorded video event of interest, wherein the calculating is based on scores assigned to content segments and interstitial segments by the scoring step.

2. The method of claim 1, further comprising the step of: communicating at least one of the cue files to at least one of the presentation devices.

3. The method of claim 2, further comprising the step of: receiving a listing of recorded content maintained at the presentation devices;
wherein the communicating step selectively communicates cue files for recorded video events included in the listing.

4. The method of claim 1, further comprising the step of: broadcasting the cue files in a format that is compatible with the presentation devices.

5. The method of claim 1, wherein the viewer measurement data for any individual recorded video event comprises content-identifying data that uniquely identifies an airing or broadcast of the individual recorded video event by a particular video service.

6. The method of claim 5, wherein the content-identifying data comprises:
a service identifier of the particular video service; and
an original program start time of the individual recorded video event.

7. The method of claim 1, wherein the viewer measurement data comprises temporal markers that indicate changes in playback status as captured by the presentation devices during presentation of the recorded video events.

8. The method of claim 7, wherein the temporal markers indicate changes in playback status corresponding to at least one of:
skip-forward starting;
skip-forward ending;
skip-backward starting;
skip-backward ending;
playing recorded video event;
pausing recorded video event;
stopping recorded video event;
exiting playback device/service;
fast-forward starting;
fast-forward ending;
fast-rewind starting; and
fast-rewind ending.

9. The method of claim 7, wherein the temporal markers are associated with timestamp references of the recorded video events.

10. The method of claim 7, wherein for each recorded video event of interest, the analyzing step comprises:
reviewing the viewer measurement data as collected to identify particular sequences of the temporal markers, wherein the particular sequences indicate unwatched or skipped segments of the recorded video event of interest; and
designating a beginning time reference and an ending time reference of each unwatched or skipped segment, based on the temporal markers included in the identified particular sequences.

11. The method of claim 10, wherein the particular sequences of the temporal markers include:
a first sequence comprising a "fast-forward start" marker followed by a "fast-forward end" marker;
a second sequence comprising a "skip-forward start" marker followed by a "skip-forward end" marker;
a third sequence comprising a "fast-forward start" marker followed by a "play" marker or a "pause" marker;
a fourth sequence comprising a "skip-forward start" marker followed by a "play" marker or a "pause" marker;
a fifth sequence comprising a plurality of "skip-forward start" markers alternating with a plurality of "skip-forward end" markers;
a sixth sequence comprising a "fast-forward end" marker, followed by a "fast-rewind start" marker, followed by a "fast-rewind end" marker;
a seventh sequence comprising a "skip-forward end" marker, followed by a "skip-backward start" marker, followed by a "skip-backward end" marker;
an eighth sequence comprising a "fast-forward end" marker, followed by a "skip-backward start" marker, followed by a "skip-backward end" marker;
a ninth sequence comprising a "skip-forward end" marker, followed by a "fast-rewind start" marker, followed by a "fast-rewind end" marker.

12. The method of claim 1, further comprising the step of: collecting, with the processing system, additional viewer measurement data from the presentation devices; and
repeating the analyzing and generating steps to update the cue files as needed.

13. The method of claim 1, wherein the generating step generates the cue files in a format that enables the presentation devices to identify the estimated boundaries for purposes of selectively playing or selectively skipping certain segments of the corresponding video events.

14. A computer-implemented processing system comprising:
a processor device; and
a non-transitory computer readable medium operatively associated with the processor device, the computer readable medium comprising executable instructions configurable to cause the processor device to perform a method of managing recorded video events, the method comprising the steps of:
collecting viewer measurement data from a plurality of presentation devices, the viewer measurement data indicating user viewing behavior associated with playback of recorded video events;
analyzing the viewer measurement data as collected to estimate boundaries between segments of the recorded video events, the analyzing resulting in groups of estimated boundaries corresponding to the recorded video events;
generating cue files for the recorded video events, the cue files indicating the estimated boundaries corresponding to the recorded video events; and
maintaining the generated cue files for access by the plurality of presentation devices, wherein for each recorded video event of interest, the analyzing step comprises:
estimating individually-derived segment boundaries for the recorded video event of interest, using only the viewer measurement data collected from an individual one of the presentation devices, wherein the estimating step is repeated for viewer measurement data collected from a plurality of different presentation devices to obtain a corresponding plurality of device-specific segment boundary groups for the recorded video event of interest;
scoring segments of the recorded video event of interest as defined by the individually-derived segment boundaries by assigning a first score to each content segment and by assigning a second score to each interstitial segment; and calculating, from the plurality of device-specific segment boundary groups, group-derived segment boundaries between segments of the recorded video event of interest, wherein the calculating is based on scores assigned to content segments and interstitial segments by the scoring step.

15. The processing system of claim 14, wherein the viewer measurement data comprises temporal markers that indicate changes in playback status as captured by the presentation devices during presentation of the recorded video events.

16. The processing system of claim 15, wherein the temporal markers indicate changes in playback status corresponding to at least one of:
   skip-forward starting;
   skip-forward ending;
   skip-backward starting;
   skip-backward ending;
   playing recorded video event;
   pausing recorded video event;
   stopping recorded video event;
   exiting playback device/service;
   fast-forward starting;
   fast-forward ending;
   fast-rewind starting; and
   fast-rewind ending.

17. The processing system of claim 15, wherein the temporal markers are associated with timestamp references of the recorded video events.

18. The processing system of claim 15, wherein for each recorded video event of interest, the analyzing step comprises:
   reviewing the viewer measurement data as collected to identify particular sequences of the temporal markers, wherein the particular sequences indicate unwatched or skipped segments of the recorded video event of interest; and
   designating a beginning time reference and an ending time reference of each unwatched or skipped segment, based on the temporal markers included in the identified particular sequences.

19. A computer-implemented and executed method of managing recorded video events, the method comprising the steps of:
   collecting, with a processing system, viewer measurement data from a plurality of presentation devices, the viewer measurement data indicating user viewing behavior associated with playback of recorded video events;
   for each recorded video event of interest, performing the following steps with the processing system:
      estimating individually-derived segment boundaries between segments of the recorded video event of interest, using only the viewer measurement data collected from an individual one of the presentation devices, wherein the estimating step is repeated for viewer measurement data collected from a plurality of different presentation devices to obtain a corresponding plurality of device-specific segment boundary groups for the recorded video event of interest;
      scoring segments of the recorded video event of interest as defined by the individually-derived segment boundaries by assigning a first score to each content segment and by assigning a second score to each interstitial segment;
      calculating, from the plurality of device-specific segment boundary groups, group-derived segment boundaries between segments of the recorded video event of interest, wherein the calculating is based on scores assigned to content segments and interstitial segments by the scoring step; and
      generating a cue file for the recorded video event of interest, the cue file indicating the calculated group-derived segment boundaries between segments of the recorded video event of interest;
   maintaining, at the processing system, generated cue files corresponding to at least some of the recorded video events; and
   communicating at least one of the generated cue files from the processing system, wherein cue files communicated from the processing system are intended for receipt by at least one of the presentation devices, wherein the generated cue files are formatted to enable the presentation devices to identify the calculated group-derived segment boundaries for purposes of selectively playing or selectively skipping certain segments of the recorded video events.

* * * * *